(12) United States Patent
Koerdt

(10) Patent No.: US 12,403,815 B2
(45) Date of Patent: Sep. 2, 2025

(54) LIGHT GUIDE MODULE FOR A PRIMARY OPTICAL ASSEMBLY OF A MOTOR VEHICLE LIGHTING DEVICE WITH COLLAR HAVING HEIGHT THAT CORRESPONDS TO LENGTH OF A LIGHT GUID SEGMENT AND PRIMARY OPTICAL ASSEMBLY HAVING THE SAME

(71) Applicant: Hella GmH & Co KGaA, Lippstadt (DE)

(72) Inventor: Christian Koerdt, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 103 days.

(21) Appl. No.: 16/999,456

(22) Filed: Aug. 21, 2020

(65) Prior Publication Data
US 2021/0053481 A1    Feb. 25, 2021

(30) Foreign Application Priority Data
Aug. 21, 2019    (DE) ...................... 10 2019 122 450.0

(51) Int. Cl.
*B60Q 3/62*    (2017.01)
*B60Q 1/02*    (2006.01)
*F21V 8/00*    (2006.01)

(52) U.S. Cl.
CPC .................. *B60Q 1/02* (2013.01); *B60Q 3/62* (2017.02); *G02B 6/0006* (2013.01); *G02B 6/0008* (2013.01)

(58) Field of Classification Search
CPC .......... F21S 41/24; F21S 41/29; F21S 43/235; F21S 43/236; F21S 43/237; F21S 43/241;
(Continued)

(56) References Cited

U.S. PATENT DOCUMENTS 6,739,738 B1 *    5/2004    Smith .................. F21S 43/315
                                                            362/317
10,598,328 B2    3/2020    Stoehr et al.
(Continued)

FOREIGN PATENT DOCUMENTS

DE    102016124800 A1    6/2018
DE    102017214636 A1    2/2019
EP       2306077 A2    4/2011

OTHER PUBLICATIONS

Machine translation of Braun et al. DE 2016 124800 A1, retrieved from worldwide.espacenet.com on Aug. 30, 2021 (Year: 2021).*
(Continued)

*Primary Examiner* — Abdulmajeed Aziz
*Assistant Examiner* — Steven Y Horikoshi
(74) *Attorney, Agent, or Firm* — Muncy, Geissler, Olds & Lowe, P.C.

(57) ABSTRACT

A light guide module for a primary optical assembly of a motor vehicle lighting device. The light guide module has a plurality of elongated light guide segments arranged next to one another, each having a proximal end with a light coupling face and a distal end. The distal ends of the light guide segments lead into a light exit face of the light guide module and a length of the light guide segments is defined by the distance between the proximal end and the distal end. A collar extends at least in sections around the light exit face, wherein the collar has a local height that corresponds substantially to the length of the respective light guide segment nearest adjacent to the collar. The local height is defined by the distance between a proximal end section of the collar and a distal end section of the collar.

8 Claims, 5 Drawing Sheets

(58) Field of Classification Search
CPC ...... F21S 43/245; F21S 43/249; F21S 43/251; G02B 7/008; G02B 7/028
See application file for complete search history.

(56) References Cited

U.S. PATENT DOCUMENTS

| | | | |
|---|---|---|---|
| 2008/0253144 A1* | 10/2008 | Dolson | F21S 41/24 362/547 |
| 2009/0129079 A1 | 5/2009 | Grotsch et al. | |
| 2009/0213606 A1 | 8/2009 | Coushaine et al. | |
| 2013/0051014 A1* | 2/2013 | Sikkens | F21S 41/24 362/235 |
| 2014/0133168 A1* | 5/2014 | Fiederling | F21S 41/24 362/235 |
| 2015/0192264 A1 | 7/2015 | Holzl et al. | |
| 2015/0226395 A1* | 8/2015 | Taudt | F21S 41/25 362/511 |
| 2019/0063708 A1* | 2/2019 | Stoehr | F21S 41/151 |
| 2019/0338930 A1* | 11/2019 | Spinger | F21V 19/0015 |

OTHER PUBLICATIONS

Dictionary definition of Length, retrieved from Dictionary.com on Jul. 5, 2022 (Year: 2022).*

* cited by examiner

LIGHT GUIDE MODULE FOR A PRIMARY OPTICAL ASSEMBLY OF A MOTOR VEHICLE LIGHTING DEVICE WITH COLLAR HAVING HEIGHT THAT CORRESPONDS TO LENGTH OF A LIGHT GUID SEGMENT AND PRIMARY OPTICAL ASSEMBLY HAVING THE SAME

This nonprovisional application claims priority under 35 U.S.C. § 119(a) to German Patent Application No. 10 2019 122 450.0, which was filed in Germany on Aug. 21, 2019, and which is herein incorporated by reference.

BACKGROUND OF THE INVENTION

Field of the Invention

The present invention relates to a light guide module for a primary optical assembly of a motor vehicle lighting device, wherein the light guide module comprises a plurality of elongated light guide segments arranged next to one another, each having a proximal end with a light coupling surface and a distal end, wherein the distal ends of the light guide segments lead into a light exit face of the light guide module and a length of the light guide segments is defined in each case by the distance between the proximal end and the distal end. Further, the invention relates to a primary optical assembly of a motor vehicle lighting device comprising a light guide module, a support frame, and a mounting bracket.

Description of the Background Art

In modern motor vehicle lighting devices, light-emitting diodes (LEDs) are frequently installed in a matrix-like arrangement as a light, the light of which is guided by associated light guides. The individual light guides are usually designed as segments of a one-piece light guide module, wherein the proximal ends, i.e., those facing the LEDs, of the light guides each have a light coupling face and their distal ends lead into a common light exit face. Such light guide modules are usually made of a highly transparent silicone, which is characterized by a high stability of its optical and mechanical properties over a wide temperature range and at rapid temperature changes. The light guide modules are usually fastened to a support frame and/or a so-called separator with a mounting bracket, as a result of which a primary optical assembly is formed for placement in front of an LED array. The light coupling occurs into the proximal ends of the light guide segments typically via a small air gap between the LED and the light coupling face. This air gap is necessary because if the LED is in direct contact with the light guide segment, an undesired color shift of the coupled light would occur.

In the context of the present description, the terms "proximal" and "distal" are used in relation to the position of the LED light in a lighting device. Component sections of the light guide module that are disposed close to the LEDs and directions that point to the LEDs are referred to as "proximal," whereas component sections that are disposed on the side facing away from the LEDs and directions that point away from the LEDs are referred to as "distal."

A major challenge for the operation of an associated motor vehicle lighting device is to keep the distance between the LEDs and the light coupling faces of the light guide segments constant over a wide range of arising operating temperatures, which is made difficult due to the high thermal expansion coefficient of the silicone of approximately 250-300×10$^{-6}$ K$^{-1}$. Changes in the gap dimension disadvantageously lead to an undesirable and uncontrollable change in the light output and/or to color shifts in the coupled light. In particular when the lighting device is switched on, the light guide module experiences a strong heating due to the operating heat radiated by the LEDs, which results in particular in a pronounced longitudinal expansion of the individual light guide segments.

In order to counter this problem, the light guide segments in the state of the art are dimensioned such that in the as-assembled, cold state of the lighting device there is a distance, increased by a calculated oversize, between the LEDs and the light coupling faces, wherein the distance is only reduced to a gap dimension suitable for coupling light during the operation of the LEDs due to the thermal longitudinal expansion of the light guide segments. A disadvantage of this solution is that the lighting device thus has a certain warm-up phase until the light guide module has warmed up completely and uniformly, wherein the functionality of the lighting device is reduced during this warm-up phase due to the inadequate light coupling. In addition, extreme temperatures in the operating environment, therefore, for example, during operation in summer heat or at freezing temperatures, can significantly impair the thermally induced setting of a gap dimension that is ideal for light coupling.

Alternatively, for example, DE 10 2017 214 636 A1, which corresponds to U.S. Pat. No. 10,598,328, proposes a lighting system which has an optical unit having a light guide and in which a spacer is arranged between the optical unit and the printed circuit board carrying the LEDs. To position the light guide, this spacer has a bearing opening into which the light guide is introduced, wherein the bearing opening has on its edge region at least one support face which faces the printed circuit board and on which the light guide introduced into the bearing opening can be supported. For this purpose, the light guide can have, for example, a step or a projection, which can then bear against the support surface from a certain insertion depth of the light guide, as a result of which further displacement of the light guide into the bearing opening, i.e., in the direction of the LEDs, can be limited in particular when the light guide expands due to an increase in temperature. A disadvantage of this design is that a circumferential step or a projection has to be molded into the proximal end section of the light guide in order to achieve the support effect. On the one hand, this is associated with increased manufacturing costs, and, on the other, such an edge in the conductor cross section can lead to undesired light losses due to scattering and/or diffraction.

SUMMARY OF THE INVENTION

It is therefore an object of the present invention to provide a light guide module for a primary optical assembly of a motor vehicle lighting device and a primary optical assembly which overcomes the aforementioned disadvantages of the state of the art and enables in a structurally simple manner a light coupling, which is constant over the entire range of usual operating temperatures, between the LEDs and the light guide module.

In an exemplary embodiment, the invention includes the technical teaching that the light guide module has a collar that extends at least in sections around the light exit face, wherein the collar has a local height that corresponds substantially to the length of the respective light guide segment nearest adjacent to the collar, wherein the local height is defined in each case by the distance between a proximal end section of the collar and a distal end section of the collar. In particular, the collar surrounds the light guide segments like an enveloping body, wherein the collar between its proximal end section and its distal end section runs substantially parallel to the respective nearest adjacent light guide segment. Furthermore, the light module is disposed in the primary optical assembly of the invention between the support frame and the mounting bracket such that the proximal end section of the collar bears against the support frame.

The invention is based on the idea of creating a thermosymmetric compensation element with the circumferential collar, and the element's thermal expansion movement has a significant influence on the thermal deformation of the entire light guide module in that the light guide segments adjacent to the collar are taken along during its thermal expansion. In this regard, the geometric dimensions of the collar and the adjacent light guide segments match in the main direction of expansion, i.e., in a direction between the proximal ends and the light exit face, so that the light guide segments can assume their thermal equilibrium shape without being subjected to additional deformation due to a constraint at the edge. As a result, the light guide segments lying further inwards can likewise realize a substantially free thermal deformation, provided the length differences between adjacent light guide segments are small or the light guide segments in particular all have the same length.

To explain the mechanisms described, it should again be explicitly pointed out here that the light guide module, as is customary in the state of the art, is made materially in one piece, wherein the entirety of the distal ends of the light guide segments form the common light exit face on which the circumferential collar at the edge is formed. The light guide segments are therefore in direct interaction with one another and with the collar and correspond to one another in particular with regard to their thermal expansion.

The object on which the invention is based is achieved by means of the light guide module of the invention in that the proximal end section of the collar in a primary optical assembly of the invention is disposed between the support frame and the mounting bracket such that it bears against the support frame. This prevents thermal expansion of the collar in the direction of the support frame, and thus in the direction of the LEDs disposed behind the support frame in a suitable lighting device, so that, when heated, the entire longitudinal expansion of the collar takes place in the distal direction, i.e., pointing away from the LEDs. Accordingly, the light guide segments adjacent to the collar will also undergo a longitudinal expansion that runs exclusively in the distal direction, because they are coupled to the expansion of the collar via their distal ends, and, at the same time, the inner light guide segments will also be subject to a purely distal longitudinal expansion. The fastening of the proximal end section of the collar to the support frame thus also achieves an indirect fixation of the proximal ends of the light guide segments; i.e., when the light guide module is heated, admittedly a distal displacement and possibly a slight deformation of the light exit face occur in relation to the support frame and thus in relation to LEDs rigidly disposed behind the support frame, but in contrast there is no change in the position of the proximal ends of the light guide segments. In a corresponding lighting device, the size of the gap between the LEDs and the light coupling faces at the proximal ends of the light guide segments therefore remains temperature-invariant, so that a light coupling that is constant over the entire range of operating temperatures is ensured.

The light coupling can face all of the light guide segments that are arranged in a common plane. Such an arrangement or dimensioning of the light guide segments is possible due to the inventive preference of an intrinsic temperature independence of the position of the light coupling faces without the proximal ends of the light guide segments, as known from DE 10 2017 214 636 A1, which corresponds to U.S. Pat. No. 10,598,328, which is incorporated herein by reference, having to be additionally secured against thermal expansion in the proximal direction, i.e., in the direction of the LEDs usually also arranged in one plane, by means of a stepped design and separate support faces on the support frame. If the LEDs in an associated lighting device have a less regular arrangement, in particular do not lie in a common plane, the light coupling faces of the light guide segments would of course also have to have a complementary arrangement—the advantage of the invention is in any case that all light coupling faces can already be arranged at an identical distance to the associated LEDs on the assembly side, because no heat-related change in this distance can occur during operation of the lighting device.

The light guide module of the invention can have a concavely curved or flat light exit face. A concave curvature can be realized in particular in that the light coupling faces of all light guide segments are arranged in a common plane and the length of the light guide segments varies accordingly, and in that therefore longer segments are arranged at the edge than in the central region of the light exit face. The concave curvature serves to focus the light beam emerging from the light guide module, which is subsequently picked up by a lens system in an associated lighting device. When the light guide module is heated, the longer light guide segments at the edge have an absolutely greater longitudinal expansion than the shorter inner segments, so that a more pronounced curvature of the light exit face and thus a stronger focusing effect occur in the warm state. In the case of a flat light exit face, all light guide segments are of equal length and arranged parallel to one another. On the design side, this variant has the advantage that each light guide segment can be manufactured without an undercut.

To fasten the light guide module in a primary optical assembly of the invention, the proximal end section of the collar is advantageously designed as a protruding flange and the mounting bracket of the primary optical assembly is preferably designed such that it surrounds the light guide module like a frame and fixes the flange on the support frame like a clamp. This ensures a robust attachment of the proximal end of the collar, whereas the collar's distal end which leads into the light exit face can expand freely when heated.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1b shows a side view of the light guide module from FIG. 1a;

FIG. 1c shows a further side view of the light guide module from FIG. 1a;

FIG. 2 shows a sectional view of the light guide module from FIG. 1a; and

DETAILED DESCRIPTION

Figure 1A:
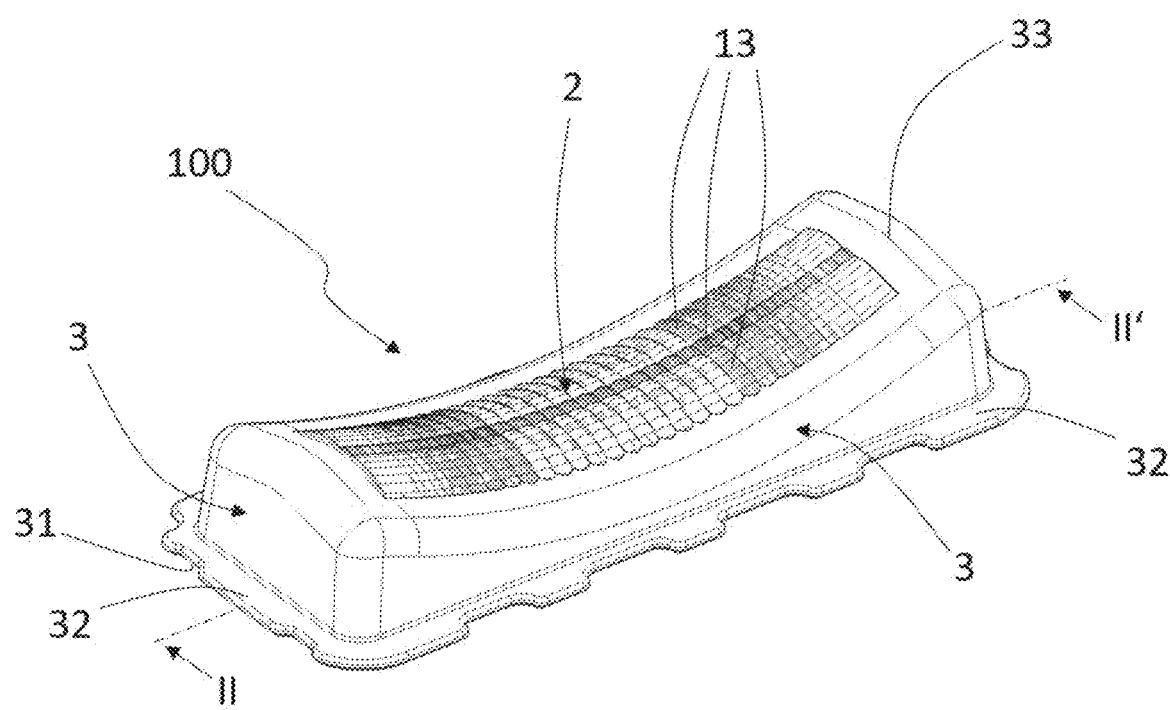
FIG. 1a shows a perspective view of a light guide module of the invention.
Figure 1B:
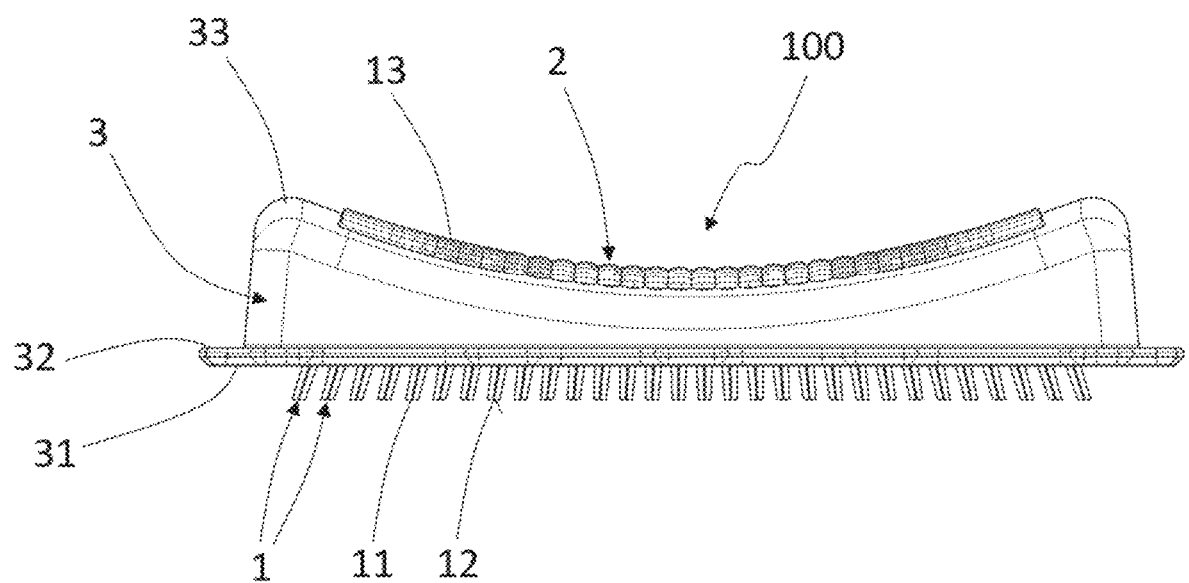
Figure 1C:
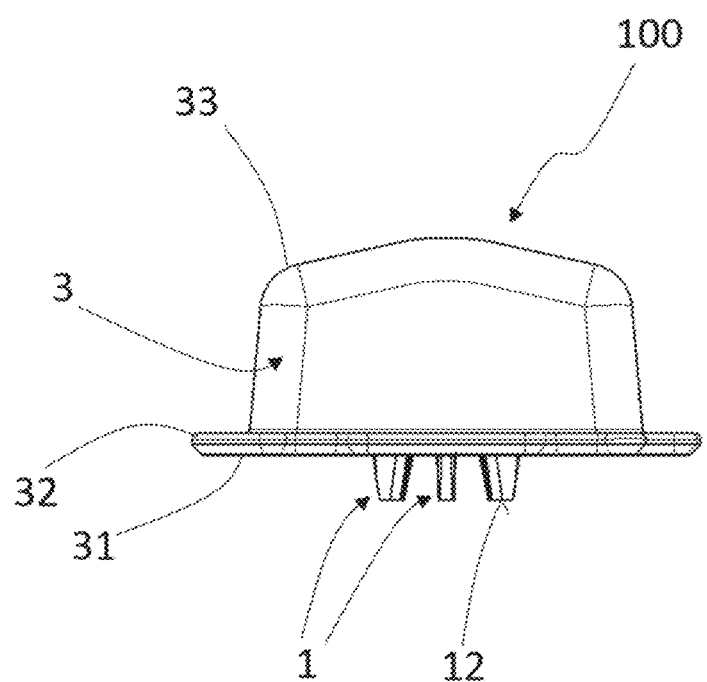

FIGS. 1a, 1b, and 1c show perspective views of a light guide module 100 of the invention, whose light exit face 2 is formed from the distal ends 13 of a plurality of light guide segments 1 (for the sake of clarity, only selected light guide segments 1 are provided with the associated reference numerals) and which is limited at the edge by full-perimeter collar 3.

Light guide segments 1 are arranged side by side like a matrix; in the example shown there are 3×30 light guide segments 1, which are assigned to a corresponding 3×30 array of LEDs in an associated lighting device.

The cross sections of light guide segments 1 can be, for example, round or oval and/or vary along the longitudinal extent of light guide segments 1. In particular, as in the example shown, the cross section between light coupling face 12 at proximal end 11 and distal end 13 can increase continuously. Light coupling faces 12 of all light guide segments 1 are arranged in a common plane which corresponds to a horizontal in FIGS. 1b and 1c. Due to the different lengths of light guide segments 1 and a certain inclination of adjacent light guide segments 1 to one another, light exit face 2 has a concavely curved shape.

Circumferential collar 3 leads with its distal end section 33 into light exit face 2 and its proximal end section 31 is designed as a full-perimeter flange 32.

Light guide module 100 is made materially of one piece and is made of an optically transparent silicone, for example, by means of an injection molding process.

Figure 2:
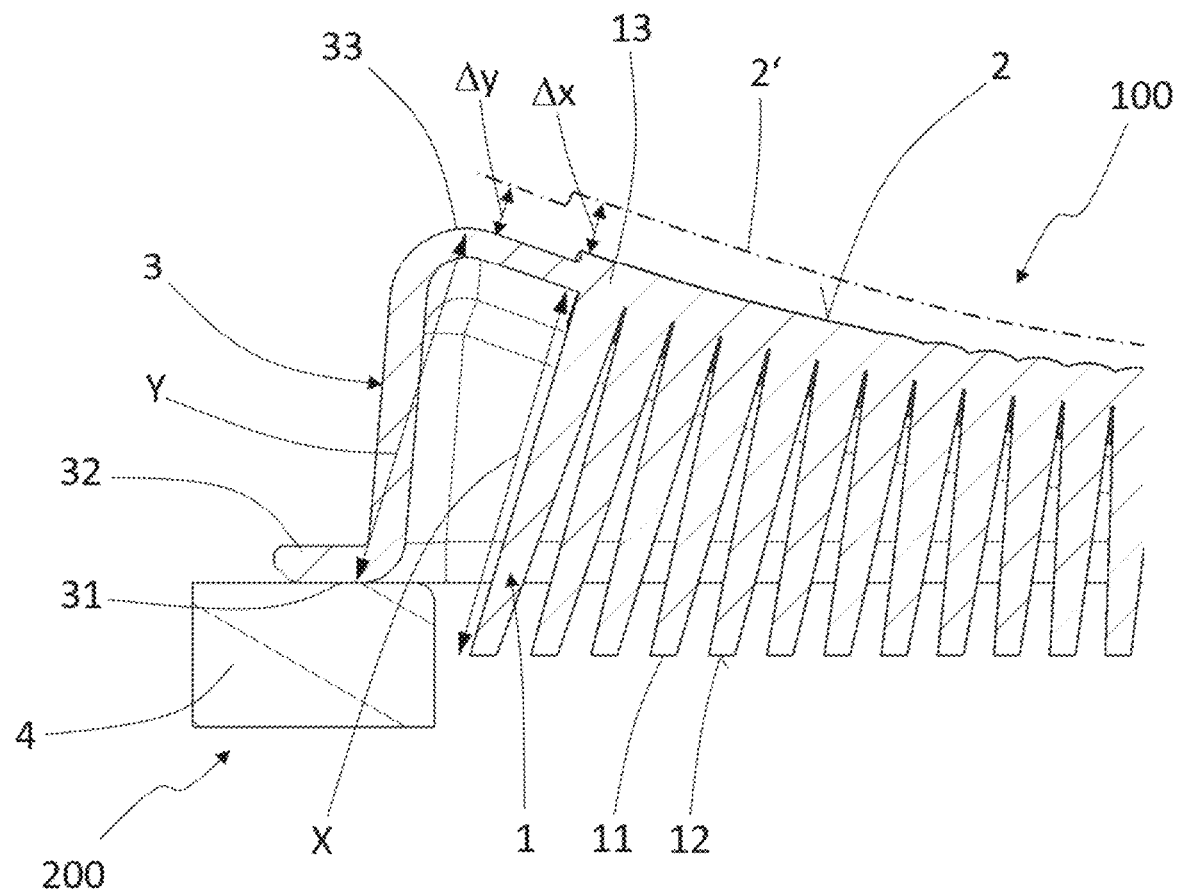

FIG. 2 shows a sectional view of light module 100 along a partial section of the section line II-II' drawn in FIG. 1a. The central characteristic of the invention is explained here, which is that the local height Y of collar 3, which is defined as the distance between proximal end section 31 and distal end section 33, corresponds to the length X of light guide segment 1 adjacent to collar 3. In this context, "local" means that the height Y varies along the perimeter of light guide module 100 in the example shown, corresponding to the variation in the length X of the circumferentially arranged light guide segments 1.

In the intended installation position of light guide module 100, proximal end section 31 of collar 3 is fastened on support frame 4 of a primary optical assembly 200 of the invention, wherein the latter is not shown completely here. Attachment to another component would also be conceivable which is rigidly disposed in a corresponding lighting device with respect to the LED light. Because of such an attachment, collar 3 cannot carry out a longitudinal expansion in the proximal direction when light guide module 100 is heated during operation of the associated lighting device; instead the entire thermal enlargement Δy of the height Y will occur in the distal direction, so that the distal end section 33 undergoes a longitudinal displacement by the amount Δy with respect to support frame 4 disposed under proximal end section 31. Because the height Y according to the invention is equal to the length X of light guide segment 1 nearest adjacent to collar 3, the thermally induced change in length Δx of light guide segment 1 also corresponds substantially to the change in height Δy, i.e., Δx=Δy, wherein a uniform heating of entire light guide module 1 is assumed. The expansions Δx and Δy shown in the FIG. 2 are exaggerated for the sake of clarity; in the case of the temperature increase, arising in real operation, of up to about 100 K, the relative linear expansion of a silicone is only about 2-3%.

Due to the materially integral connection of distal end 13 of light guide segment 1 to distal end section 33 of collar 3, the constraint, represented by the fixing of proximal end section 31 of collar 3, also becomes effective indirectly for the thermally induced deformation of light guide segment 1, so that the longitudinal expansion Δx occurs in the exclusively distal direction. Because all light guide segments 1 are integrally connected to one another via their distal ends 13, this effect of a directional deformation affects not only light guide segments 1 directly adjacent to collar 3, but to the same extent light guide segments 1 disposed further inwards as well. Overall, the thermal expansion of light guide module 100 thus leads to a displacement of light exit face 2 in the distal direction, so that it bears approximately against the contour line 2' shown in FIG. 2. Due to the slightly different lengths X of the various light guide segments 1, the respective absolute changes in length Δx are also different in size, so that the distal displacement of light exit face 2 is also accompanied by a certain change in its curvature. It is necessary to design the differences in length of adjacent light guide segments 1 to be as small as possible so that the compensation effect of the invention acts on the entirety of all light guide segments 1.

The essential technical effect of the present invention is that the thermal deformation of light guide module 100 does not lead to a change in the position of proximal end 11 of light guide segments 1. All light guide segments 1 can assume their thermal equilibrium shape, wherein, however, due to the edge-side support of collar 3 on support frame 4 this occurs by an expansion Δx in the exclusively distal direction and proximal ends 11 with light coupling surfaces 12, facing the LEDs, remain unchanged in position in relation to support frame 4. Thus, the gap between light coupling faces 12 and the LEDs, rigidly disposed on or behind support frame 4, remains unchangeable during temperature changes of light guide module 100, so that a constantly optimal light coupling into light guide segments 1 is ensured.

At this point, the importance of the feature Y=X according to the invention is expressly pointed out. If, for example, collar 3 were dimensioned smaller, therefore, Y<X, Δy<Δx would also result therefrom. In this case, the expansion of light guide segment 1 adjacent to collar 3 would be restricted in the distal direction, so that light guide segment 1 could assume its thermal equilibrium shape only by an additional longitudinal expansion in the proximal direction, as a result of which its light coupling face 12 would be shifted closer to the associated LED. Conversely, Y>X and thus Δy>Δx would lead to an excessive distal displacement of light exit face 2, which would also be associated with a distal displacement of proximal ends 11 of light guide segments 1 and thus to a disadvantageous enlargement of the gap to the LEDs.

Figure 3:
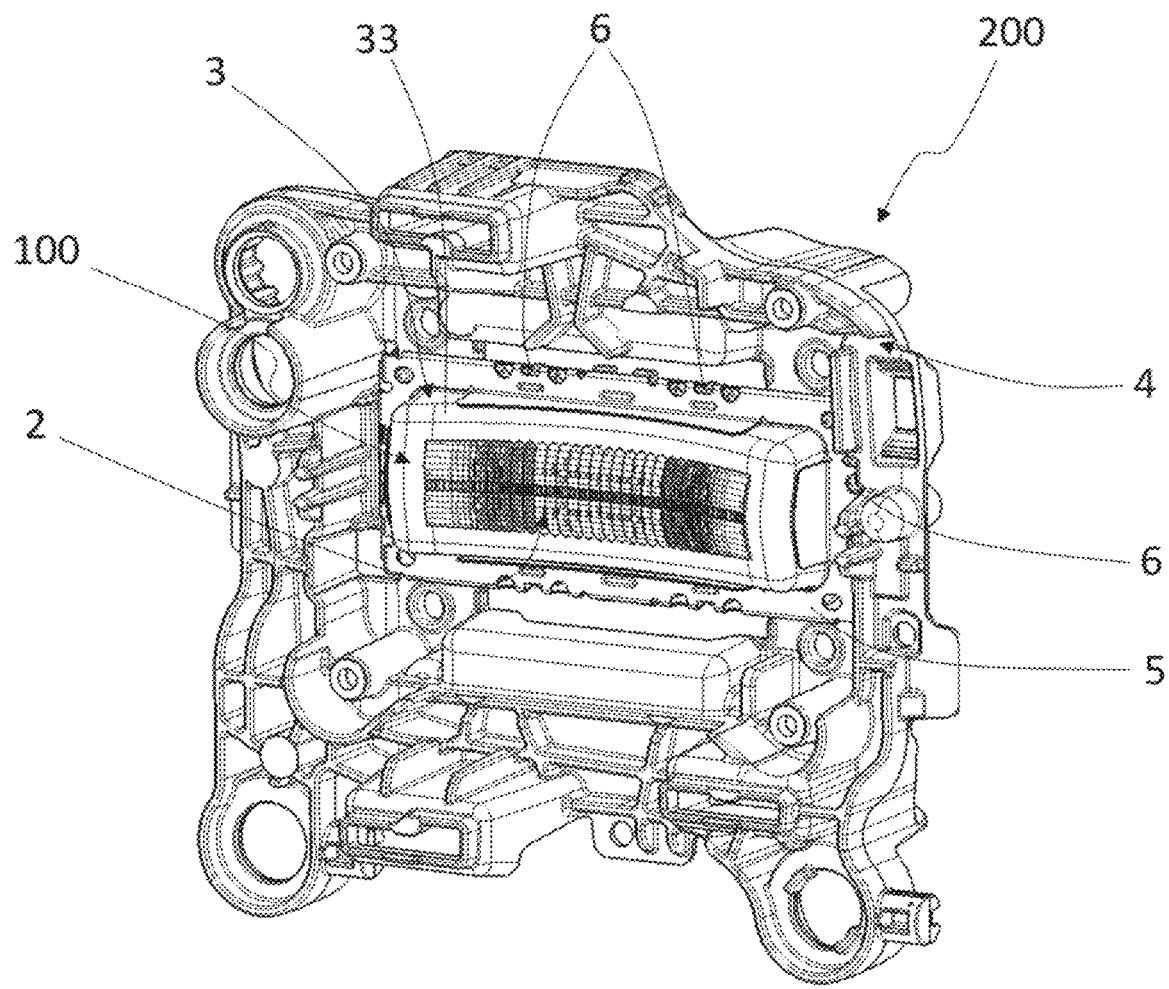
FIG. 3 shows a primary optical assembly of the invention.

FIG. 3 shows a primary optical assembly 200 of the invention with light guide module 100 on support frame 4, wherein mounting bracket 5 is used to attach light guide module 100. In an associated lighting device, the LED light is disposed behind support frame 4, i.e., on the side of support frame 4 facing away from the viewer in FIG. 3, and support frame 4 has one or more openings in the section provided for receiving light guide module 100, so that the light emitted by the LEDs can be coupled into proximal ends 11 of the individual light guide segments 1 (see, for example, FIG. 1*b*) of light guide module 100.

Mounting bracket 5 has a frame-like shape and covers flange 32 which goes around collar 3 of light guide module 100 at the edge (see, for example, FIG. 1*a*). By means of the clamp-like fastener 6, mounting bracket 5 is pressed down onto flange 32, so that it is clamped and fixed between mounting bracket 5 and support frame 4 (for the sake of clarity, not all fasteners are provided with reference numerals). With a mounting of this kind, there is no restriction of light guide module 100 with regard to its deformability in the distal direction; i.e., when it is heated, distal end section 33 of collar 3 and thus also light exit face 2 can carry out the previously described distal displacement without hindrance, so that proximal ends 11 of light guide segments 1 remain unchangeable in position with respect to support frame 4 and the LEDs.

The invention is not limited in its implementation to the preferred exemplary embodiment described above. Rather, a number of variants are conceivable which make use of the described solution in fundamentally different embodiments as well. All features and/or advantages emerging from the claims, description, or drawings, including structural details and spatial arrangements, can be essential to the invention both alone and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light guide module for a primary optical assembly of a motor vehicle lighting device, the light guide module comprising:
    at least two elongated light guide segments arranged next to one another, each of the at least two light guide segments having a proximal end with a light coupling face and a distal end, the distal ends of the light guide segments leading into a light exit face of the light guide module and a length of the light guide segments being defined by a distance between the proximal end and the distal end; and
    a collar that extends at least in sections around the light exit face,
    wherein the collar has a local height that corresponds substantially to a length of the respective light guide segment nearest adjacent to the collar,
    wherein the local height is defined by a distance between a proximal end section of the collar and a distal end section of the collar, with the proximal end section of the collar being a protruding flange, and
    wherein the proximal ends of the light guide segments extend beyond the protruding flange of the collar.

2. The light guide module according to claim 1, wherein the collar surrounds the light guide segments, and wherein the collar, between the proximal end section and the distal end section, runs substantially parallel to the respective nearest adjacent light guide segment.

3. The light guide module according to claim 1, wherein the light coupling faces of the light guide segments are arranged in a common plane.

4. The light guide module according to claim 1, wherein the light exit face is concavely curved.

5. The light guide module according to claim 1, wherein the light guide module is made of a silicone.

6. The light guide module according to claim 1, wherein the local height of the collar is equal to the length of the respective light guide segment nearest adjacent to the collar.

7. A primary optical assembly of a motor vehicle lighting device comprising:
    the light guide module according to claim 1;
    a support frame; and
    a mounting bracket,
    wherein the proximal end section of the collar is a flange and the flange is disposed between the support frame and the mounting bracket such that the proximal end section of the collar bears against the support frame.

8. The primary optical assembly according to claim 7, wherein the mounting bracket surrounds the light guide module and the flange is fixed between the support frame and the mounting bracket.

* * * * *